United States Patent [19]

Malina

[11] Patent Number: 5,964,908
[45] Date of Patent: Oct. 12, 1999

[54] CLOSED LOOP ENERGY CONVERSION PROCESS

[76] Inventor: Mylan Malina, 316 Malina Dr., Rogersville, Mo. 65742

[21] Appl. No.: 08/921,946

[22] Filed: Aug. 28, 1997

Related U.S. Application Data

[63] Continuation-in-part of application No. 08/582,913, Jan. 4, 1996, Pat. No. 5,711,770.

[51] Int. Cl.$^6$ .................................. C01B 3/24; C25B 1/02
[52] U.S. Cl. ...................... 48/197 R; 48/127.1; 48/199; 48/204; 48/198.3; 204/129
[58] Field of Search ................................ 48/127.1, 197 R, 48/199, 204, 198.3; 204/129

[56] References Cited

U.S. PATENT DOCUMENTS

| | | | |
|---|---|---|---|
| 3,488,401 | 1/1970 | Ames ........................................ | 260/679 |
| 3,619,365 | 11/1971 | Baguley et al. ........................... | 176/38 |
| 3,820,965 | 6/1974 | New ........................................ | 48/197 R |
| 3,930,812 | 1/1976 | Harris et al. ........................... | 48/197 R |
| 3,958,957 | 5/1976 | Koh et al. ............................... | 48/197 R |
| 4,452,676 | 6/1984 | Birbara et al. ........................... | 204/129 |
| 4,519,206 | 5/1985 | van Michaels ........................... | 60/39.54 |
| 5,128,003 | 7/1992 | Murdoch et al. ........................ | 204/129 |
| 5,362,373 | 11/1994 | Murdoch et al. ........................ | 204/242 |

OTHER PUBLICATIONS

Bockris et al. "On the Splitting of Water" Int. Journal of Hydrogen Energy, vol. 10, No. 30 (1985) pp. 179–201.

*Primary Examiner*—Walter D. Griffin
*Assistant Examiner*—Tam M. Nguyen
*Attorney, Agent, or Firm*—Senniger, Powers, Leavitt & Roedel

[57] ABSTRACT

A closed loop energy conversion system for converting a non-fossil fuel energy source to a fossil fuel without generating air polluting emissions when the fossil fuel is combusted to provide energy to an external source. The closed loop energy conversion apparatus employed in this process includes a dissociation unit for dissociating water into hydrogen gas and oxygen gas and separating hydrogen gas from oxygen gas. An energy source provides energy to the dissociation unit. Oxygen gas and hydrocarbon gas react in a hydrocarbon combustion unit to form a combustion product comprising carbon dioxide gas and water vapor. A first heat exchanger cools the combustion product and condenses water vapor from the combustion product. A carbon dioxide separator separates carbon dioxide gas from water condensed in the first heat exchanger. Carbon dioxide gas reacts with hydrogen gas in a hydrocarbon synthesis reactor to form a mixture comprising hydrocarbon gas and water vapor. A second heat exchanger cools the mixture and condenses water vapor from the mixture. A hydrocarbon separator separates hydrocarbon gas from water condensed in the second heat exchanger. A conduit system directs oxygen gas from the dissociation unit to the hydrocarbon combustion unit, carbon dioxide gas from the hydrocarbon combustion unit to the hydrocarbon synthesis reactor, water from the hydrocarbon combustion unit and the hydrocarbon synthesis reactor to the dissociation unit, hydrogen gas from the dissociation unit to the hydrocarbon synthesis reactor, and hydrocarbon gas from the hydrocarbon synthesis reactor to the hydrocarbon combustion unit.

10 Claims, 4 Drawing Sheets

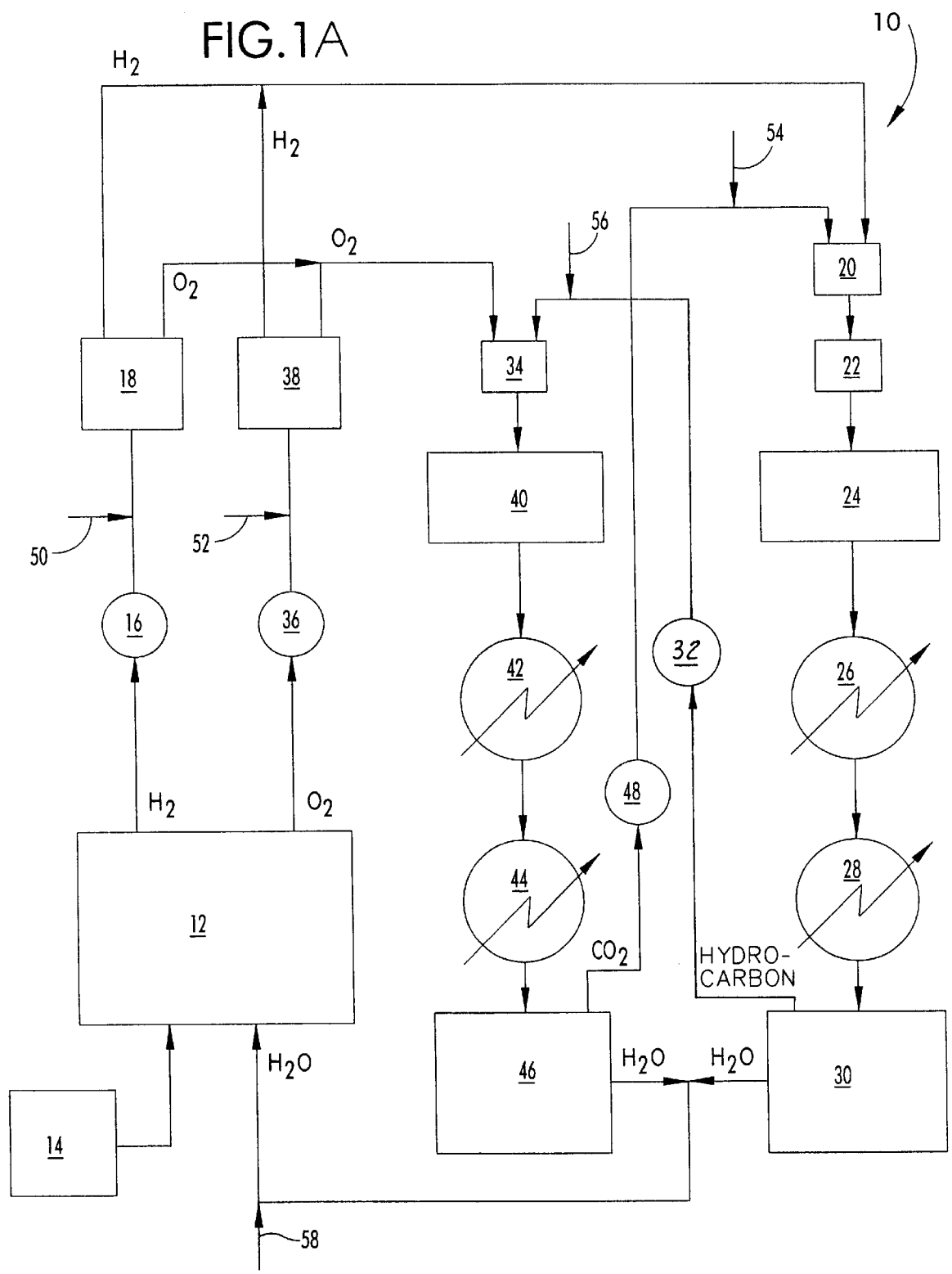

CLOSED LOOP ENERGY CONVERSION PROCESS

CROSS REFERENCE TO RELATED APPLICATION

This application is a continuation-in-part of application Ser. No. 08/582,913, filed Jan. 4, 1996, now U.S. Pat. No. 5,711,770.

BACKGROUND OF THE INVENTION

The present invention relates generally to a closed loop energy conversion system for providing thermal energy from the combustion of a hydrocarbon without releasing air polluting combustion emissions into the atmosphere. The invention particularly relates to a closed loop apparatus and method for generating energy from the combustion of an alkane.

Gas, oil, coal or other fossil fuels are typically combusted in heat (energy) generating apparatuses such as boilers, furnaces and internal combustion engines, producing reaction by-products which pollute the atmosphere. The pollutants include carbon dioxide, nitrogen oxides, and sulfur oxides. The deleterious effects of combustion emissions on mammalian health and the Earth's atmosphere, such as the greenhouse effect and acid rain, are well documented. There is a need in industry to substantially reduce or eliminate such emissions.

The use of fossil fuels producing minimal emissions is highly desirable. Natural gas, a "clean" burning fuel, is in adequate supply at present, but the use of less desirable fossil fuels, such as coal and oil, could be necessitated as the natural gas supply dwindles. Mining, drilling and refining operations required to produce fuel from coal or oil and subsequent transportation of the fuel to the site of use are expensive.

Attempts have been made to reduce the amount of environmental pollution produced by combustion of fossil fuels. U.S. Pat. No. 3,820,965 describes a process in which purified carbon dioxide, water and nitrogen are recovered from stack gas emissions produced by combustion of gas, oil or coal in air. The purified carbon dioxide is reacted with hydrogen gas to form potable water for commercial use and methane. The methane can be recycled and used as fuel for combustion, reducing the amount of pollutants released into the atmosphere. Hydrogen gas is produced by converting nonpotable water from seas, rivers, lakes or polluted water sources into its constituents, hydrogen and oxygen, carbon monoxide or metal oxides. Recovered nitrogen, metal oxides and oxygen are diverted for economical use.

The above-described method is disadvantageous because it requires continuous addition of water and stack gases to the system in order to produce methane. The water generated in the methanation reaction is not recycled and dissociated to provide hydrogen gas for producing methane. Rather, the system must be located near a substantial water source and must include water purifying processes in order to provide water for the dissociation. Oxygen generated in dissociating water is not recovered for use in combusting methane once synthesized. Instead, the methane is combusted in air, which produces nitrogen oxides and other pollutants which are released into the atmosphere.

SUMMARY OF THE INVENTION

Among the objects of the invention, therefore, may be noted the provision of a process for providing energy, such as heat, to an external source from the combustion of a fossil fuel without discharging waste by-products from the combustion into the atmosphere; the provision of such a process for converting a non-fossil fuel energy source such as radiation or electricity into a renewable fossil fuel; the provision of such a closed loop process which generally does not require addition of substantial amounts of reactants or removal of substantial amounts of reaction products; the provision of such a process which produces a fossil fuel for use as an energy source at the location where the fuel is to be used without generating pollutants at the location; and the provision of a closed loop energy conversion system comprised of conventional apparatuses by which such a process is achieved.

The present invention is directed to a closed loop energy conversion apparatus including a dissociation unit for dissociating water into hydrogen gas and oxygen gas and separating hydrogen gas from oxygen gas. An energy source provides energy to the dissociation unit. Oxygen gas and hydrocarbon gas react in a hydrocarbon combustion unit to form a combustion product comprising carbon dioxide gas and water vapor. A first heat exchanger cools the combustion product and condenses water vapor from the combustion product. A carbon dioxide separator separates carbon dioxide gas from water condensed in the first heat exchanger. Carbon dioxide gas reacts with hydrogen gas in a hydrocarbon synthesis reactor to form a mixture comprising hydrocarbon gas and water vapor. A second heat exchanger cools the mixture and condenses water vapor from the mixture. A hydrocarbon separator separates hydrocarbon gas from water condensed in the second heat exchanger. A conduit system directs oxygen gas from the dissociation unit to the hydrocarbon combustion unit, carbon dioxide gas from the hydrocarbon combustion unit to the hydrocarbon synthesis reactor, water from the hydrocarbon combustion unit and the hydrocarbon synthesis reactor to the dissociation unit, hydrogen gas from the dissociation unit to the hydrocarbon synthesis reactor, and hydrocarbon gas from the hydrocarbon synthesis reactor to the hydrocarbon combustion unit.

The present invention is also directed to a method for providing energy from hydrocarbon combustion in a closed loop system. Water dissociates into hydrogen gas and oxygen gas. Hydrogen gas separates from oxygen gas. Oxygen gas reacts with hydrocarbon gas to form a combustion product comprising carbon dioxide gas and water vapor. Energy from the combustion product is transferred to an external source. Water vapor from the combustion product condenses. Carbon dioxide gas separates from water. Carbon dioxide gas reacts with hydrogen gas to form a mixture comprising hydrocarbon gas and water vapor. Energy from the mixture is transferred to an external source. Water vapor from the mixture condenses. Hydrocarbon gas separates from water. Hydrocarbon gas is recycled for reaction with oxygen gas, water from the mixture and the combustion product is recycled for dissociation, and carbon dioxide gas is recycled for reaction with hydrogen gas.

Other objects and advantages of the invention will be apparent from the following detailed description.

BRIEF DESCRIPTION OF THE DRAWINGS

FIG. 1A is a schematic flowsheet of the process of the invention, illustrating a closed loop system for generating energy;

DETAILED DESCRIPTION OF THE PREFERRED EMBODIMENTS

Figure 1B:
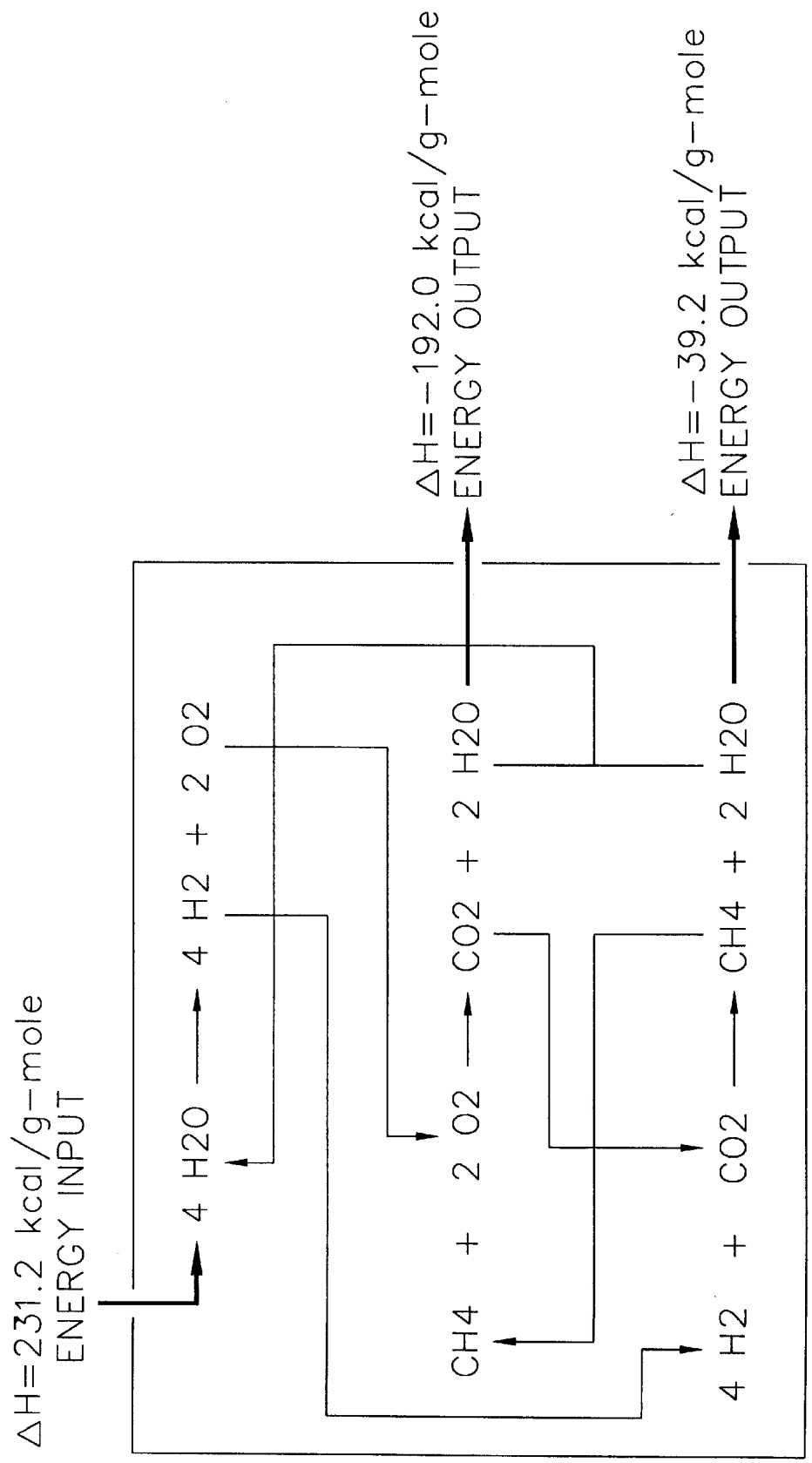
FIG. 1B is a schematic flowsheet of the process of the invention, illustrating the material and energy flows.

In accordance with the present invention, it has been discovered that a fossil fuel can be combusted in a conventional energy generating apparatus, such as a boiler or internal combustion engine, to provide energy without discharging waste by-products from the combustion into the atmosphere by utilizing a closed loop energy conversion system. Energy introduced into the system to dissociate water into hydrogen and oxygen is released from the system when hydrogen and carbon dioxide are reacted to form a hydrocarbon gas and water, and when the hydrocarbon gas is combusted in oxygen to form carbon dioxide and water. The closed loop system generally does not require addition of reactants or removal of products from the system because each of the reaction products is recycled and used as a reactant within the system and because each of the reaction products are in the proper stoichiometric ratio for complete use as a reactant.

The start-up procedure for the closed loop system generally (see FIG. 1A discussed below) is as follows:

(1) Power is directed to the dissociation unit 12. The hydrogen gas produced is directed to the hydrocarbon synthesis reactor 24 and the oxygen gas produced is temporarily vented off;

(2) Carbon dioxide gas from a compressed gas cylinder is directed to the hydrocarbon synthesis reactor 24 and reacted with the hydrogen gas to yield hydrocarbon gas and water;

(3) The oxygen gas that was temporarily vented off and the hydrocarbon gas are directed to the hydrocarbon combustion unit 40 and both are combined to yield carbon dioxide gas and water; and (4) The carbon dioxide gas is vented off to purge the system and then directed to the hydrocarbon synthesis reactor 24 at which time the carbon dioxide gas vent line is closed, the cylinder carbon dioxide gas line is closed and the carbon dioxide feed line from the combustion unit is opened, the opening and closing of these lines occurring substantially simultaneously.

Upon completion of this start-up procedure, the system will operate in a substantially closed loop manner.

A closed loop energy conversion system 10 is illustrated in FIG. 1A. Water is directed to a dissociation unit 12 in which water is dissociated into hydrogen gas and oxygen gas. An energy source 14 supplies the power required for operation of the dissociation unit. The amount of power supplied to the dissociation unit determines (and is proportional to) the magnitude and rate of energy output of the combustion and hydrocarbon synthesis reactions in the system. The dissociation unit, when utilizing electrolysis, collects hydrogen and oxygen gasses in separate chambers as the gasses evolve.

Hydrogen gas formed in the dissociation unit passes through a pump 16 which directs the gas to a gas separator 18. The gas separator removes oxygen gas present in the hydrogen gas to provide purified hydrogen gas. The purified hydrogen gas is then directed to a gas mixer 20 which mixes hydrogen gas with carbon dioxide gas. The mixed gas is directed to a preheater 22 for preheating the reactants to the reaction temperature. The gas then flows to a hydrocarbon synthesis reactor 24 in which an exothermic reaction between carbon dioxide and hydrogen results in the formation of a gas mixture comprising hydrocarbon gas and water vapor. Preheater 22 may not be required if the reactor 24 is designed utilizing a heat exchanger to preheat the gas to reaction temperature and to transfer energy to an external source for any desired use. The gas mixture is directed from the reactor 24 to a heat exchanger 26 in which residual energy from the gas mixture is transferred to an external source for any desired use.

The cooled gas mixture is then directed to a condenser 28 in which the latent heat of the water vapor is absorbed by a coolant, causing water vapor to condense. The water and hydrocarbon gas mixture is then directed to a hydrocarbon separator 30. Water collects in the lower portion of the separator 30 and is recycled to the dissociation unit 12 where it is dissociated. The hydrocarbon gas accumulated in the upper portion of the separator 30 flows to a pump 32 which directs the hydrocarbon gas to a gas mixer 34.

As hydrogen gas is purified and supplied to the hydrocarbon synthesis reactor, oxygen gas formed in the dissociation unit 12 passes through a pump 36 which directs it to a gas separator 38. The gas separator removes hydrogen gas present in the oxygen gas to provide purified oxygen gas. Hydrogen gas removed from the purified oxygen gas in separator 38 is mixed with the purified hydrogen gas exiting the separator 18. Likewise, oxygen gas removed from the purified hydrogen gas in separator 18 is mixed with the purified oxygen gas exiting the separator 38. The purified oxygen gas is then directed to the gas mixer 34 which mixes oxygen gas with the hydrocarbon gas. The mixed gas is directed to a hydrocarbon combustion unit 40 in which an exothermic reaction between oxygen gas and the hydrocarbon gas results in the formation of a combustion product comprising carbon dioxide gas and water vapor. The combustion product is directed to a heat exchanger 42 in which energy from the combustion product gas is transferred to an external source for any desired use. The hydrocarbon combustion unit 40 may also incorporate a heat exchanger (i.e., a boiler).

The cooled combustion product is then directed to a condenser 44 in which the latent heat of the water vapor is absorbed by a coolant, causing water vapor to liquefy. The water and carbon dioxide gas mixture is then directed to a carbon dioxide separator 46. Water collects in the lower portion of the separator 46 and is recycled to the dissociation unit 12 where it is dissociated. Carbon dioxide gas accumulated in the upper portion of the separator 46 flows to a pump 48 which directs carbon dioxide gas to the gas mixer 20 for use in the hydrocarbon synthesis reactor 24, thus completing the closed loop system.

The hydrogen gas, oxygen gas, carbon dioxide gas, water, water vapor and hydrocarbon gas reaction products produced by the dissociation, combustion and hydrocarbon synthesis reactions are consequently at the proper stoichiometric ratio for use as reactants in each respective reaction. The activation energy of each reaction is surpassed and supplied by:

(1) The external power source for the dissociation reaction; and (2) The initial preheater, consequential temperature from exothermic reaction, and the use of an appropriate catalyst for the hydrocarbon synthesis reaction; and (3) The initial ignition and consequential temperature from exothermic reaction for the combustion reaction.

Thus, the latter three reactions proceed immediately and continuously. Selection of the reactant flow rates and catalysts for use in the reactor is well known in the art and is dependant upon the hydrocarbon to be produced. If methane is produced, for example, the following reactions and stoichiometry will occur within the system:

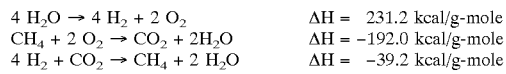

| | |
|---|---|
| $4 H_2O \rightarrow 4 H_2 + 2 O_2$ | $\Delta H = 231.2$ kcal/g-mole |
| $CH_4 + 2 O_2 \rightarrow CO_2 + 2H_2O$ | $\Delta H = -192.0$ kcal/g-mole |
| $4 H_2 + CO_2 \rightarrow CH_4 + 2 H_2O$ | $\Delta H = -39.2$ kcal/g-mole |

FIG. 1B illustrates the material and energy flows for the process when methane is the hydrocarbon employed in the process.

Referring back to FIG. 1A, as the closed loop energy conversion system is continuously operated, nominal amounts of reactants and/or products may be added to or removed from the system to compensate for reactions which do not proceed to absolute completion. Make-up streams of hydrogen gas, oxygen gas, carbon dioxide gas, hydrocarbon gas and water are fed to the system via lines 50, 52, 54, 56, and 58, respectively, to supply such nominal amounts of reactants to the system as needed. The carbon dioxide gas make-up stream initially provides carbon dioxide gas to the gas mixer 20 at start-up of the closed loop system until adequate carbon dioxide gas is produced by combustion of the hydrocarbon gas.

The dissociation unit 12 is any apparatus which dissociates water into hydrogen gas and oxygen gas. The unit can operate by well known methods including electrolysis, photoelectrolysis, photolysis, electrochemical photovoltaics, radiolysis, plasmolysis, magnetolysis, thermal catalysis, and bio-catalysis. Preferably, the dissociation unit operates by electrolysis to form hydrogen gas at a cathode and oxygen gas at an anode. Such units have a partition between the cathode chamber and anode chamber to separate hydrogen gas from oxygen gas.

The energy source 14 is any non-fossil energy source such as electricity or radiation. The system of the present invention converts such a non-fossil fuel energy source to a fossil fuel without generating air polluting emissions when the fossil fuel is combusted to provide energy to an external source. The external source can be any object outside the closed loop energy conversion system which is to be heated or which utilizes heat energy, such as a materials stream in a processing plant or an internal combustion engine.

Hydrogen gas formed in the dissociation unit 12 and carbon dioxide gas formed in the hydrocarbon combustion unit 40 are reacted in the hydrocarbon synthesis reactor 24 to form a hydrocarbon gas such as methane, ethane, propane, butane, pentane or other alkane and water vapor. In a preferred embodiment, a Sabatier reaction occurs in the hydrocarbon synthesis reactor. A Sabatier reaction occurs when hydrogen and carbon dioxide gasses react to form methane and water vapor at a temperature between about 275° C. and about 400° C., preferably between about 300° C. and about 400° C., in the presence of a suitable catalyst, such as nickel. Selection and operation of a hydrocarbon synthesis reactor is well known in the art, and is described in *Catalyst Handbook* (Martin Twigg ed., Wolfe Publishing Ltd., London, England 1989) and Paul Sabatier, *Catalysts in Organic Chemistry* (E. E. Reid trans., The Library Press, London, England 1923).

The hydrocarbon combustion unit 40 is an indirect-fired unit in which the products of combustion and the flame used to ignite the hydrocarbon are not in direct contact with the material being heated. Such units include boilers, kettles, vaporizers, stills, internal combustion engines, and furnaces. Boilers and furnaces are typically used in combustion of hydrocarbons, and are preferred for purposes of the present invention.

The following example is presented to describe an embodiment of the present invention and is not meant to limit the present invention unless otherwise stated in the claims appended hereto.

EXAMPLE

Figure 2:
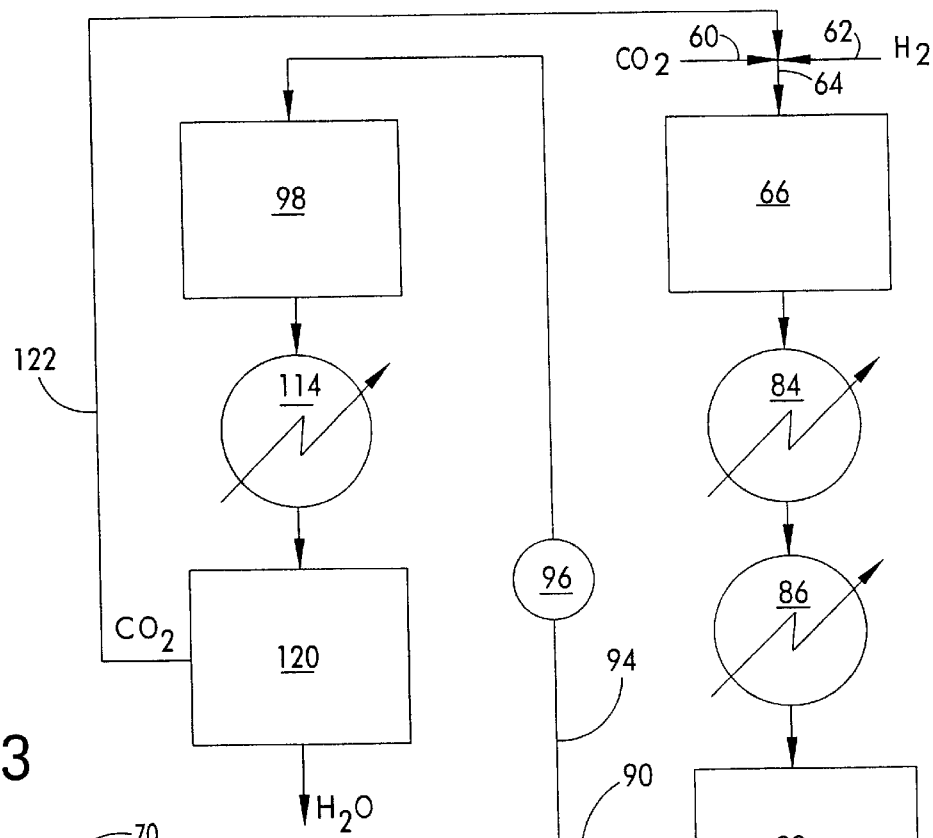
FIG. 2 is a schematic flowsheet of a laboratory scale embodiment of the process of the present invention.

A closed loop conversion system, as shown in FIG. 2 was assembled on a laboratory scale to illustrate operation of the invention. Compressed cylinders of pure hydrogen and pure oxygen were substituted for hydrogen and oxygen gas formed by dissociation of water.

The process was initiated by feeding pure compressed carbon dioxide gas 60 and pure compressed hydrogen gas 62 through respective gas flow meters at rates of 330 cm³/min and 1320 cm³/min, respectively, into a ⅜ inch FDA grade clear vinyl tubing. The gases were mixed as they flowed through a portion of the tubing 64 containing about two feet of ⅛ inch Denstone 57 beads.

Figure 3:
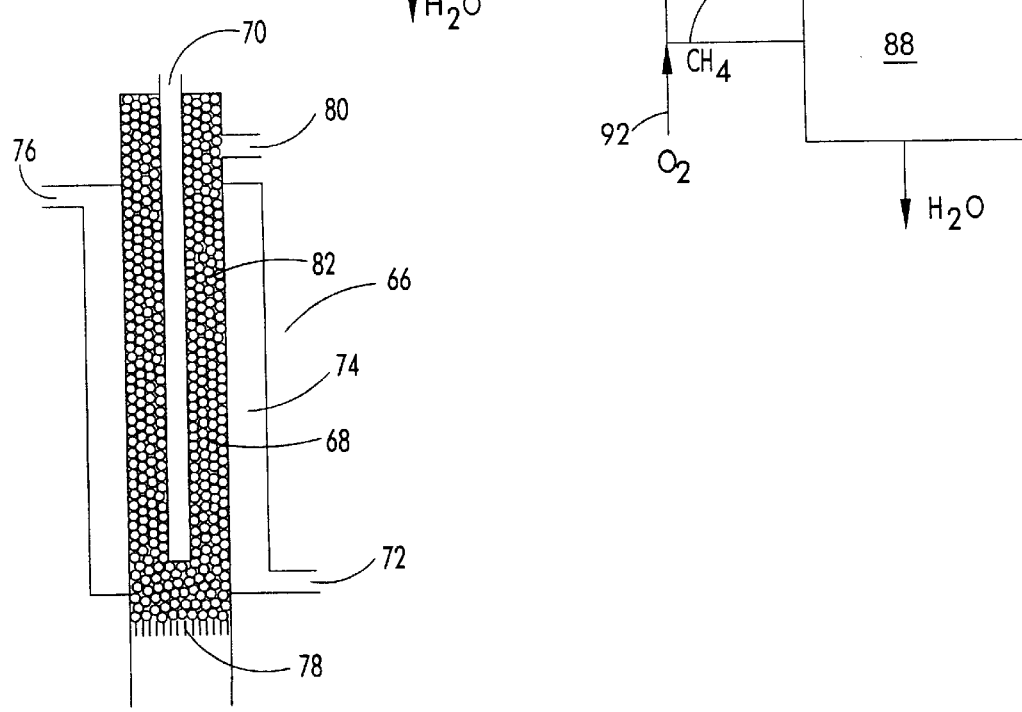
FIG. 3 is a sectional view of a Sabatier reactor as used in the laboratory scale process.

The mixed gases were then fed to a Sabatier reactor 66 as shown in FIG. 3. The reactor was constructed of 304 stainless steel and included a reaction chamber 68 of ⅝ inch O.D. tubing with 0.035 inch wall thickness. A tube 70 axially centered within the reaction chamber of the Sabatier reactor was composed of ⅛ inch diameter stainless steel tubing and was used in conjunction with a sliding thermocouple (not shown) for monitoring reaction temperatures. High temperature Dow Corning 210H fluid was fed through an inlet 72 of an outer chamber 74 of 1½ inch O.D. and 0.065 inch wall thickness, and exited through outlet 76. The fluid was recirculated and maintained at a temperature ranging from about 325° F. to about 345° F. by a Lauda type high temperature heating circulator.

The reaction chamber 68 was initially filled with ⅛ inch×⅛ inch nickel catalyst tablets supported by a fine mesh stainless steel screen 78 at the base of the reaction chamber. However, when the mixed hydrogen/carbon dioxide gas was fed through the reactor inlet 80, a hot spot was formed during the methanation reaction and the catalyst temperature exceeded 750° F. The reactor bed was then replaced with a layered catalyst bed 82 composed of (listed from top to bottom) 1½ inches of ⅛ inch Denstone beads, 6 inches of a 6:1 by volume mixture of Denstone beads (54 mls) and nickel catalyst (9 ml), 6 inches of a 4:1 by volume mixture of Denstone beads (52 ml) and nickel catalyst (13 ml), 9 inches of a 2:1 by volume mixture of Denstone beads (60 ml) and nickel catalyst (30 ml), and 2 inches of Denstone beads. Essentially all of the methanation reaction took place in the initial 7½ inches of the catalyst bed. A conversion rate of at least 95% was obtained at a catalyst temperature of 600° F.±25° F. using a recirculating fluid temperature of 335° F.±10° F. The optimum temperature depends upon the space velocity, linear gas velocity, residence time, type of nickel catalyst, and such other parameters.

As shown in FIG. 2, the gas containing methane and water vapor produced in the Sabatier reactor was then fed to a heat exchanger 84 to cool the gas and transfer heat energy to an external source for any desired use. The cooled gas was then fed to a water-cooled condenser 86 to condense remaining water vapor and separate it from the methane gas. The water was collected in reservoir 88. The methane flowed through ⅜ inch vinyl tubing 90 and was monitored via a gas sampling septa. Samples were taken periodically and analyzed for methane, carbon dioxide and oxygen content using a Hewlett-Packard Model 5980A gas chromatograph. The hydrogen feed rate was slightly adjusted to optimize the Sabatier reaction based upon the analysis results. A check valve positioned downstream from the septa was used to prevent possible gas back flow. A flame arrester downstream of the check valve was used to prevent possible flash back.

Pure compressed oxygen gas 92 was fed through a gas flow meter at a rate of 660 cm$^3$/min into tubing 90. The gases were mixed in a portion of the tubing 94 containing about 18 inches of ⅛ inch Denstone beads. The gas mixture was pumped through a peristaltic pump 96 at a rate of 990 cm$^3$/min. Pressure gauges installed immediately before and after the pump were used to maintain the pressure through the pump by making fine adjustments in the pump flow rate after the system was operating as a closed system. Pressure within the system was maintained at 1–5 lb/in$^2$. The gas was then fed to a methane combustion unit 98. A check valve and a flame arrester were installed before the inlet of the methane combustion unit to prevent possible gas back flow or flash back.

Figure 4:
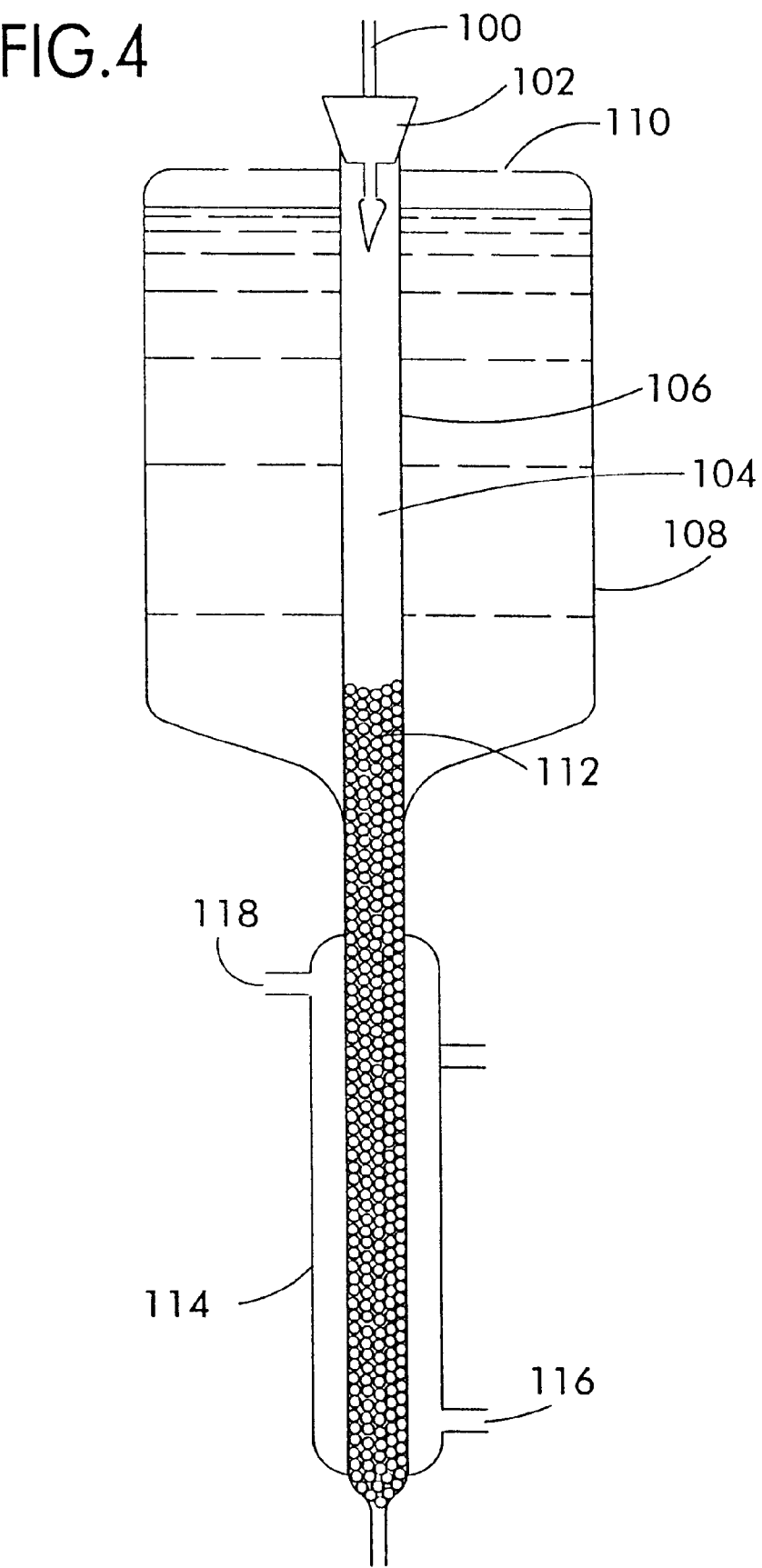
FIG. 4 is a sectional view of a methane combustion apparatus, heat exchanger and condenser as used in the laboratory scale process.

FIG. 4 illustrates the methane combustion unit which was constructed of a stainless steel tube 100 (0.040 inch I.D.) inserted through a rubber stopper 102 such that the tip extended about 1¼ inch beyond the stopper. The oxygen/methane gas was fed through the tube 100 and ignited before the stopper 102 was inserted into the opening of the combustion chamber 104 made from 25 mm O.D. Pyrex tubing 106. The tubing 106 is surrounded by a one gallon Nalgene PC bottle 108. Cold water enters the bottle through openings 110 within the top of the bottle. The oxygen/methane gas was combusted to form carbon dioxide and water vapor. Denstone beads 112 (⅛ inch) were placed in the lower six inches of the combustion chamber 104 to facilitate cooling of carbon dioxide and water vapor combustion gases by transferring heat to water within the bottle 108. The gas then flowed through a condenser 114 filled with Denstone beads for transferring heat to the surrounding water coolant which flows through inlet 116 and exits through outlet 118. Referring now to FIG. 2, water vapor within the gas was condensed and collected in a reservoir 120. Carbon dioxide flowed through ⅜ inch vinyl tubing 122 which was fitted with a gas sampling septa in order to analyze by gas chromatography the carbon dioxide and oxygen content of the gas and slightly adjust the oxygen feed rate accordingly to optimize the methane combustion. Carbon dioxide was then pumped to the tubing 64 where it was mixed with hydrogen gas, completing the closed loop system.

In order for the system to operate as a closed loop, carbon dioxide from the methane combustion unit was initially vented off to purge the system. The compressed carbon dioxide cylinder used to initially operate the Sabatier reactor was no now longer required. Three solenoid valves were activated simultaneously to close the carbon dioxide vent line, open the carbon dioxide feed line 122, and close the compressed cylinder carbon dioxide line 60. The system then operated in a closed loop manner. Using the rudimentary laboratory scale equipment, the system was operated for ten complete closed loop cycles before the flame in the methane combustion unit was extinguished.

While the invention is susceptible to various modifications and alternative forms, specific embodiments thereof have been shown by way of example in the drawings and are herein described in detail. It should be understood, however, that it is not intended to limit the invention to the particular form disclosed, but on the contrary, the intention is to cover all modifications, equivalents and alternatives falling within the spirit and scope of the invention as defined by the appended claims.

I claim:

1. A method for providing energy from hydrocarbon synthesis and combustion in a closed loop system, the method comprising:

dissociating water into hydrogen gas and oxygen gas;

separating hydrogen gas from oxygen gas;

reacting oxygen gas with hydrocarbon gas to form a combustion product comprising carbon dioxide gas and water vapor;

transferring energy from the combustion product to an external source;

condensing water vapor from the combustion product;

separating carbon dioxide gas from water;

reacting carbon dioxide gas with hydrogen gas to form a mixture comprising hydrocarbon gas and water vapor;

transferring energy from the mixture to an external source;

condensing water vapor from the mixture;

separating hydrocarbon gas from water; and recycling hydrocarbon gas for reaction with oxygen gas, water from the mixture and the combustion product for dissociation, and carbon dioxide gas for reaction with hydrogen gas.

2. The method of claim 1 further including the step of mixing oxygen gas and hydrocarbon gas prior to reaction, and mixing carbon dioxide gas and hydrogen gas prior to reaction.

3. The method of claim 1 wherein the hydrocarbon gas is methane.

4. The method of claim 1 wherein the hydrocarbon gas is ethane, propane, butane or pentane.

5. A method for converting non-fossil fuel energy into fossil fuel energy, the method comprising:

dissociating water into hydrogen gas and oxygen gas using an external energy source;

separating hydrogen gas from oxygen gas;

reacting oxygen gas with hydrocarbon gas to form a combustion product comprising carbon dioxide gas and water vapor;

transferring energy from the combustion product to an external source;

condensing water vapor from the combustion product;

separating carbon dioxide gas from water;

reacting carbon dioxide gas with hydrogen gas to form a mixture comprising hydrocarbon gas and water vapor;

transferring energy from the mixture to an external source for other use;

condensing water vapor from the mixture;

separating hydrocarbon gas from water;

recycling hydrocarbon gas for reaction with oxygen gas;

recycling carbon dioxide gas for reaction with hydrogen gas; and recycling water from the mixture and the combustion product for dissociation.

6. The method of claim 5 wherein the hydrocarbon gas is methane.

7. The method of claim 5 wherein the hydrocarbon gas is ethane, propane, butane or pentane.

8. A method for providing energy from a closed loop energy conversion system without the production of nitrogen oxides, the method comprising:

dissociating water into hydrogen gas and oxygen gas by means of an external energy source;

separating hydrogen gas from oxygen gas;

reacting oxygen gas with hydrocarbon gas to form a combustion product comprising carbon dioxide gas and water vapor;

transferring energy from the combustion product to an external source;
condensing water vapor from the combustion product;
separating carbon dioxide gas from water;
reacting carbon dioxide gas with hydrogen gas to form a mixture comprising hydrocarbon gas and water vapor;
transferring energy from the mixture to an external source for other use;
condensing water vapor from the mixture;
separating hydrocarbon gas from water;
recycling hydrocarbon gas for reaction with oxygen gas;
recycling carbon dioxide gas for reaction with hydrogen gas; and
recycling water from the mixture and the combustion product for dissociation,
wherein the recycling of the carbon dioxide gas and the water produced during the hydrocarbon combustion step of the process thereby avoids the release of the carbon dioxide gas and the water outside of the closed loop energy conversion system.

9. The method of claim 8 wherein the hydrocarbon gas is methane.

10. The method of claim 8 wherein the hydrocarbon gas is ethane, propane, butane or pentane.

* * * * *